United States Patent Office 3,263,163
Patented July 26, 1966

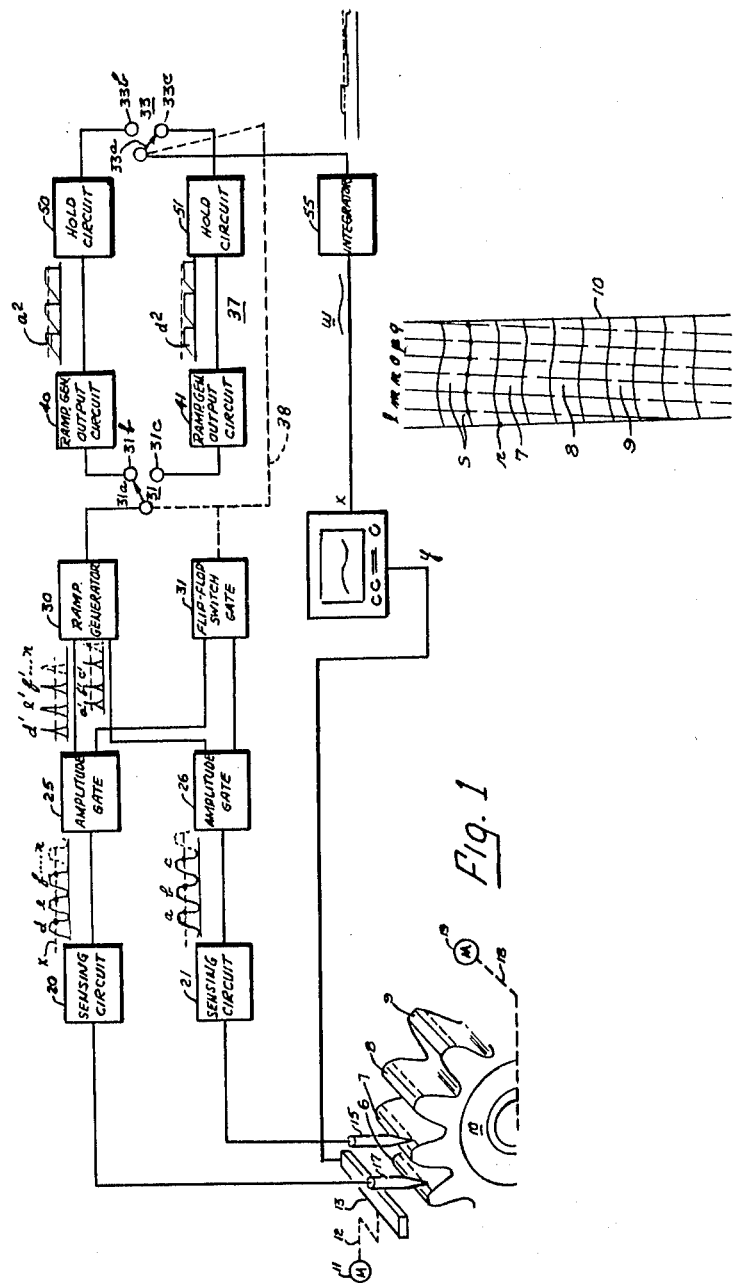

3,263,163
SYSTEM FOR MEASURING THE LEADING EDGE PROFILE OF TEETH IN A GEAR STRUCTURE
George B. Foster and Hall Cary, Worthington, Ohio, assignors, by mesne assignments, to The Reliance Electric and Engineering Company, Cleveland, Ohio, a corporation of Ohio
Filed Oct. 8, 1962, Ser. No. 228,898
1 Claim. (Cl. 324—34)

This invention relates generally to an inspection system for industrially manufactured products and specifically to the method and means of determining with precision certain critical dimensions of sections or parts of a product.

In this particular instance, the product referred to, i.e., the workpiece, is that of a gear. It will be apparent, however, that the present invention is applicable to the similar measurements of other products such as splines.

In the manufacture of gears for machinery requiring a high degree of accuracy in operation with a minimum of noise and wear, such as those used in missiles, high speed aircraft, and industrial precision equipment, the prior art inspection systems for these components have not kept abreast of the developments of the machines. The instruments that are commercially available for the inspection of gears may be classed as the sampling laboratory type. In those instances where production quantities are more important than accuracy in the workpiece, a crude inspection measurement is made; this may include making the particular measurement with respect to three or more teeth at a time. Where high precision in the workpiece is required, a more accurate type of measuring system is used—but still on a sampling basis. Further, in a single set of measurements of a gear, the measurement may take as much as eight hours per gear, consequently making it impractical to measure every gear in a production lot. In addition, the prior art systems have been extremely complicated, very expensive, and utilize principles of operation that compare the gear teeth with a master. The master is not only subject to wear but may be just as inaccurate as the gear under inspection. The techniques employed are at best only a compromise and do not meet the present day demands of reliability.

The present invention overcomes the noted disadvantages of the prior art systems by providing an inspection system capable of measuring with sufficient rapidity and continuity the average leading edge profile of the teeth in a gear structure. But of even more importance, the present invention is capable of making these measurements with an accuracy heretofore unobtainable—even with the prior art laboratory test instruments. The present invention does not employ contact elements and therefore is adaptable to industrial processes without interference or modification of the machinery or process. In this way, each and every tooth in each gear structure may be measured as it is being produced by the manufacturing process.

It is, accordingly, a principal object of the present invention to provide a new and improved measuring and inspection system for industrially manufactured products.

A further object of the present invention is to provide a new measuring system for determining with precision the average leading edge profile of sections or parts of an industrially manufactured product.

Another object of the present invention is to provide a new measuring system for gear structures or the like that is capable of measuring the average leading edge profile of every tooth in the structure as it is being produced.

Still another object of the present invention is to provide a new measuring system for a gear structure or the like that does not employ workpiece contact elements and that is adaptable to present day machinery and process without modification to the machinery or process.

Other objects and features of the present invention will become apparent from the following detailed description when taken in conjunction with the drawings in which:

FIG. 1 is a block schematic diagram of the electronic circuitry of a preferred embodiment for the inspection and measurement of the spacing between teeth, and FIG. 2 is a top laid out view of a gear showing the traversing paths relative to the leading edge profile of the tooth structure.

As known to those in the art, a gear tooth at its leading edge is not linear but has a specific curvature. The geometry of this curvature is vital to the proper operation and power transmission characteristics of the gear. Referring to the attached drawing, there is shown a complete schematic of the gear inspection and measurement system of the present invention operative to measure the average leading edge profile of the gear teeth. In its most general aspect a first distance probe develops a voltage that relates to the contour at a fixed position of the teeth at the leading edge profile. A second probe is caused to scan the gear structure to develop a second voltage that relates to the contour of the teeth at the leading edge profile—but at different positions. The developed voltages are independently utilized to frequency modulate oscillator circuits whose outputs in turn are converted to a first and second series of pulses. The pulses are generated in the two series in each series as the voltage waveform passes through an amplitude correlative with the leading edge profile. In this way the first series of pulses will vary in repetition rate in accordance with the spacing between teeth at the fixed position; and the second series of pulses will vary in repetition rate in accordance with the spacing between teeth but at different positions along the leading edge. The two series of pulses repetitively initiate and terminate the voltage rise in a ramp generator circuit. A pair of hold circuits alternately connected to the outputs of the ramp generator read out the one rise time voltage at its peak amplitude as the next voltage is building up. The outputs when combined and integrated simulate the average leading edge profile of the teeth in the gear structure under inspection.

Referring with specific reference to the drawing, the workpiece gear 10 is rotatably mounted to be rotated at a uniform rate by conventional material handling means, including motor 19 and drive 18. The probe 15 is fixed in a vertical position to probe each gear tooth 6 to 9 at its forward edge. The probes 15 and 17 are preferably that disclosed in the co-pending application S.N. 36,662, filed June 16, 1960 and now Patent No. 3,180,136, for Transducer, but may take other non-contacting forms such as the capacitance or light type of pickup. As each gear tooth is passed beneath the focus point of probe 15, the pickup will respond in a manner as set forth in the co-pending application—in this embodiment in direct relation to the physical dimensions of the gear tooth at the pitch diameter.

The pickup 15 is connected to a sensing circuit 21 having the frequency variable with its input. This circuit may be a conventional frequency modulated oscillator circuit wherein the signal from the pickup 15 frequency modulates the output. In consequence, the frequency modulated signal from the sensing circuit oscillator 21 will be a pulsating signal, having a waveform, $a, b, c \ldots n$, conforming to that of the physical dimensions with respect to the pitch diameter of each gear tooth 6, 7 8 $\ldots n$.

The pulsating signals from the sensing circuit 21 are connected to an amplitude gate circuit 26, designed to give a sharp series of pulses in response to the gating or triggering signals, $a$, $b$, $c$ . . . $n$. The amplitude gate circuit 26 is a conventional pulse generator biased to be gated on as the voltage curve at its input goes through the point corresponding to the pitch diameter. The pitch diamter is illustrated in the drawing as the reference line $x$. There results then from the amplitude gate circuit 26, upon being actuated by the pulsating signal, $a$, $b$, $c$ . . . $n$, a series of sharp pulses $a^1$, $b^1$, $c^1$ . . . $n^1$ in a timing sequence corresponding to the spacing at the pitch diameter $6a$, $7a$, $8a$ . . . $na$ between sequential gear teeth 6, 7, 8 . . . $n$.

In a duplicate circuit, the response to the pickup 17 is identical to that of the pickup 15. That is, the pickup 17 is connected to a sensing circuit 20 also having its frequency variable with its input. This circuit is the same as sensing circuit 21, and may also be a conventional frequency modulated oscillator circuit wherein the signal from the pickup 17 frequency modulates the output. The frequency modulated signal from the sensing circuit 20 will be a pulsating signal $d$, $e$, $f$ . . . $n$, conforming to that of the physical dimension of each gear tooth 6, 7, 8 . . . $n$.

The pulsating signals $d$, $e$, $f$ . . . $n$, are similar to the signals $a$, $b$, $c$ . . . $n$, in that they represent each gear tooth at the pitch diameter. However, in order to plot the average leading edge profile of the gear structure, the probe 17 is displaced in a constant motion laterally from the front edge position of the probe 15. As known in the gear art, the leading edge profile is not linear but has a distinct curvature, being a helix, or hypoidal gear form. The spacing between the probe 15 and the probe 17 will be that of the spacing between the teeth plus or minus the variation caused by curvature. The curvature of the leading edge profile is shown in FIGURE 2, somewhat exaggerated for emphasis.

Associated with the probe 17 is the traversing mechanism comprising a conventional gear arrangement 13 driven by motor 11 through linkage 12. The traversing mechanism is operative to cause the probe to scan across the gear structure at a linear rate. Referring to FIGURE 2, the dotted lines $l$, $m$, $n$, $o$, $p$, $q$ represent paths of the probe 17 relative to the gear structure. With each revolution of the gear 10, the probe 17 will have moved across to the next designated position. The rate of scan, of course, may be varied for the particular need relative to the gear structure.

Through the traversing, and hence the signal pickup from probe 17, the pulsating signals $d$, $e$, $f$ . . . $n$, will be displaced in phase from the pulsating signals $a$, $b$, $c$, plus or minus, depending on the position of the probe 17, relative to the leading edge profile of that particular gear tooth. The point $r$, for instance, will represent the signal point of the probe 15 whereas the points $s$ represent the signal points of the probe 17. It can be seen that the points $s$ occurrence varies in time relative to the leading profile.

The pulsating signals from the sensing circuit 20 are connected to an amplitude gate circuit 25, also designed to give a sharp series of pulses $d^1$, $e^1$, $f^1$ . . . $n^1$ in response to the gating or triggering signals $d$, $e$, $f$ . . . $n$. The amplitude gate circuit 25 is gated to fire at the exact voltage amplitude that amplitude gate 26 fires. The point of firing is set at the level corresponding to the pitch diameter of the tooth structure. There results from the amplitude gate 25 a series of sharp pulses $d^1$, $e^1$, $f^1$ . . . $n^1$ in a time sequence corresponding to the spacing between teeth at the pitch diameter of succeeding teeth. As pointed out above, the pulses $a^1$, $b^1$, $c^1$ resulting from the pickup probe 15 will differ from the pulses $d^1$, $e^1$, $f^1$ from the pickup probe 17 by the variation in spacing caused by the leading edge profile. That is, the first series of pulses represent the contour of the teeth at the one position; whereas the second series of pulses represent the contour of the teeth at different positions along the leading edge profile of gear teeth—the different positions being created by the scanning probe. The pulses $a^1$, $b^1$, $c^1$ . . . $n^1$ are fed simultaneously to a ramp generator 30 and to a flip-flop switch gate 31; and the pulses $d^1$, $e^1$, $f^1$ . . . $n^1$ are also fed simultaneously to the ramp generator 30 and switch gate 31. Generally, the ramp generator generator 30 has a dual output circuit 40 and 41 and a dual hold circuit 50 and 51. In operation of the ramp generator 30 as one output circuit is building up in voltage, the other hold circuit is holding at its peak voltage. Each incoming pulse reverses the action.

The rise time of the voltage output of the ramp generator 30 will be directly related to the timing between the on-off pulses. More specifically, the pulse $a^1$ initiates the rise time voltage in the ramp generator 30, in a manner similar to a saw tooth generator or other rise-time generator. This signal $a^2$ continues to build up in amplitude in the first output circuit 40 until the arrival of the pulse $d^1$. This second pulse $d^1$ actuates the switch gate 31, which in turn causes the first hold circuit 50 to maintain the peak level of the output voltage $a^2$ built up in the first ramp generator output circuit 40. At the same time, the switch circuit 31 transfers the ramp generator 30 to a second output circuit 41. This second pulse $d^1$ returns the ramp generator 30 to zero level and permits the voltage $d^2$ to build up in the second output circuit 41 until the arrival of the next pulse $b^1$. At this instant, the second hold 51 is switched in to maintain the peak level of the output voltage $d^2$ in the second ramp generator output circuit 41. Simultaneously, the first ramp generator output circuit 40 is returned to zero level and begins to build up at $b^2$. This sequence of operation of building up and holding with each incoming pulse continues with each gear tooth inspected.

The switch 31 is a two-stage switch actuated from one steady state condition to another by the incoming signals from the amplitude gate circuits 25 or 26. In order to combine the outputs of the two-ramp generator hold circuits 50 and 51, the switch gate 37 comprises two switch sections 31 and 33 ganged together by shaft 38 for simultaneous action. In this way, when the ramp generator output circuit 40 is building up to its peak signal, the hold peak signal from ramp generator 41 via hold circuit 51 is being read out; and when ramp generator output circuit 41 is building up to its peak signal, the hold peak signal from ramp generator 40 via hold circuit 50 is being read out. Specifically, as a result of the ganging of the two switches 31 and 33, when the switch arm 31a is feeding the pulses from the ramp generator to its output circuit 40 by contact with terminal 31b, the hold peak level signal of the ramp generator output circuit 41 is being read out by connection of the arm 33a to the terminal 33c. When the switch gate arm 31a is connected to the terminal 31c to feed the pulses from the ramp generator to the output circuit 41, the output of the hold circuit 50 is read out by connection to terminal 33b. In essence, the switching action of switch 37 permits a step type of output waveform $a^3$, $d^3$, $b^3$, $e^3$ . . . $n^3$, to be obtained each step alternately corresponding to the peak level signals of the dual hold output circuits 50 and 51 of the ramp generator 30. The hold level of each circuit represents the elapsed time between pulses and hence, a voltage having an amplitude representing distance between pulses. The two ramp generator output circuits 40 and 41 are shown in FIGURE 1 as two separate circuits for purposes of explanation. In actuality there would be a single output circuit for the ramp generator 30 with a pair of hold circuits. That is, the ramp generator would be triggered on and off with each incoming pulse and the hold circuits 50 and 51 alternately being charged and discharged at the peak level of each rise time buildup.

The peak level signals $a^3$, $d^3$, $b^3$, $e^3$, . . . $n^3$ from the output circuits 50 and 51 are integrated in a simple resistance-capacitance network in integrator 55 to arrive at an average signal waveform w. It was pointed out above that the individual steps in the waveform w was initiated by a signal from the probe 15 at a fixed position and terminated by a signal from the probe 17 traversing across the teeth at the pitch diameter. Also, the duration of the waveform represents the spacing between teeth plus or minus the variation attributed to that caused by the leading edge profile. It is apparent, therefore, that the signal waveform w represents the average leading edge profile of the teeth in the gear structure 10.

In the production of gears on a large scale, it is necessary that the inspection of the leading edge profile of each gear structure be made without sacrificing reliability. Therefore, the present invention provides a means for "looking" at the average leading edge profile of each gear structure. In order to provide this simple, but reliable expedient for an inspection system, reference is made to the preferred embodiment that includes an X–Y cathode ray oscilloscope presentation system. An oscilloscope having X–Y inputs is available commercially and may be the Du Mont 436. The X coordinate across the screen is divided to represent the divisions or the reading points of the traversing probe 17. In this way, each segment of the coordinate will represent one division and the total will represent the full gear structure. In the Y coordinate, it is desirable to identify that particular segment or point being read out. This is accomplished by feeding to the Y coordinate a position signal from the traversing mechanism 13. The signal may be derived from a conventional position potentiometer varying in synchronism with the traversing mechanism. The waveform appearing on the screen will be that of the waveform w which in turn identifies the average leading edge profile of the gear structure. A template having a desired waveform may be placed over the screen of the scope 65 for comparison by the inspector.

Although only a certain and specific preferred embodiment is shown and described above, it is to be understood that modifications and departures may be made thereto without departing from the true spirit and scope of the invention.

We claim:

A system for measuring the leading edge profile of the teeth in a gear structure comprising, means for fixedly positioning a first distance probe to develop a voltage representative of the contour of each tooth in the structure at the leading edge profile, means for positioning a second distance probe from said first probe with a spacing approximating that of the spacing between one or more succeeding teeth, means for scanning said second probe to and fro along the horizontal dimension of said teeth, said second probe operative to develop a voltage representative of movement of said probe across the contour of each tooth in the structure at the point of traversing the leading edge profile; a first and a second sensing oscillator circuits, means for connecting the output voltage of said first probe to said first oscillator to modulate the output thereof and means for connecting the output voltage of said second probe to said second oscillator to modulate the output thereof, a first and second pulse forming circuit having said first and second oscillator outputs respectively connected thereto and each operative to generate a pulse each time said output voltage goes through a predetermined amplitude level; a ramp generator for developing a rise time voltage from a zero level, a control means, means for alternately connecting the pulse outputs from said pulse forming circuits to said ramp generator to respectively initiate and terminate repetitively said rise time voltage and simultaneously alternately connecting said pulses to said control means, a first and second hold circuit, an integrating means, means responsive to said control means output for alternately connecting one hold circuit to said ramp generator to maintain the peak value voltage while connecting the other hold circuit to said integrating means to read out the previous peak voltage of said ramp generator, and means connected to said integrating means for indicating the variations in successive ones of said peak readings as representative of the average leading edge profile of the teeth in said gear structure.

References Cited by the Examiner

UNITED STATES PATENTS 2,457,727  12/1948  Rifenbergh _____ 33—179.5
2,880,935  4/1959   Johnson _____ 324—140

WALTER L. CARLSON, *Primary Examiner.*

F. SEEMAR, R. J. CORCORAN, *Assistant Examiners.*